United States Patent [19]

Barzilai et al.

[11] 4,126,382
[45] Nov. 21, 1978

[54] OPERATIONAL METHOD FOR DISPLAYING IMAGES WITH LIQUID-CRYSTAL ELECTRO-OPTICAL DEVICES, AND APPARATUS THEREFOR

[76] Inventors: Giorgio Barzilai, Via Romana 80, Marino Laziale (Rome); Cesare M. Ottavi, Viale Somalia 214, Rome; Paolo Maltese, Via Dandolo 24, Rome; Paolo Reali, Via Livraghi 3, Rome, all of Italy

[21] Appl. No.: 636,567

[22] Filed: Dec. 1, 1975

Related U.S. Application Data

[63] Continuation of Ser. No. 397,621, Sep. 17, 1973, abandoned.

[30] Foreign Application Priority Data

Sep. 22, 1972 [IT] Italy ................. 52916 A/72

[51] Int. Cl.² ............................................. G02F 1/13
[52] U.S. Cl. ................................. 350/331; 350/333
[58] Field of Search ........................... 350/160 LC

[56] References Cited

U.S. PATENT DOCUMENTS

| T544,596 | 4/1966 | Oliver | 358/59 |
|---|---|---|---|
| 3,694,053 | 9/1972 | Kahn | 350/160 LC |
| 3,700,306 | 10/1972 | Cartmell et al. | 350/160 LC |
| 3,756,694 | 9/1973 | Soref et al. | 350/160 LC |

OTHER PUBLICATIONS

Schiekel et al., "Deformation of Nematic Liquid Crystals ...", Applied Physics Letters, vol. 19, No. 10, pp. 391-393, Nov. 15, 1971.
Jakeman et al., "Electro-Optic Response Times in LC", Physics Letters, vol. 39A, No. 1, Apr. 10, 1972, pp. 69-70.
Hareng et al., "LC Matrix Display ...", Proceedings of IEEE, Jul. 1972, pp. 913-914.

*Primary Examiner*—John K. Corbin
*Assistant Examiner*—Rolf Hille
*Attorney, Agent, or Firm*—Diller, Brown, Ramik & Wight

[57] ABSTRACT

An operational method is disclosed for the display of images by an electro-optical device comprising a liquid-crystal cell inserted between two polarizing devices, means being provided for impressing on the liquid crystal electric pulses, the improved method comprising the step of applying a pulsed energization, each pulse being any voltage waveform having a duration and an RMS amplitude such as to originate, at each pulse, a cell luminous response and not exceeding 1.3 times those which are required to produce a flash of light with a peak amplitude which cannot be further increased without causing more than one peak to appear. In the case of repetitive energization, the pulse repetition period, under steady conditions, shall be such that at the end of the period, the luminous response of the cell falls irreversibly to a value which is not more than one half of that peak value corresponding to "white level". The liquid crystals which are of interest for the invention are the nematic liquid crystals having a negative dielectric anisotropy and a substantially homeotropic alignment. The invention aims at doing away with certain defects of the prior art devices, such as too long energization and extinguishing times and reduced angle of vision.

13 Claims, 7 Drawing Figures

Fig. 1
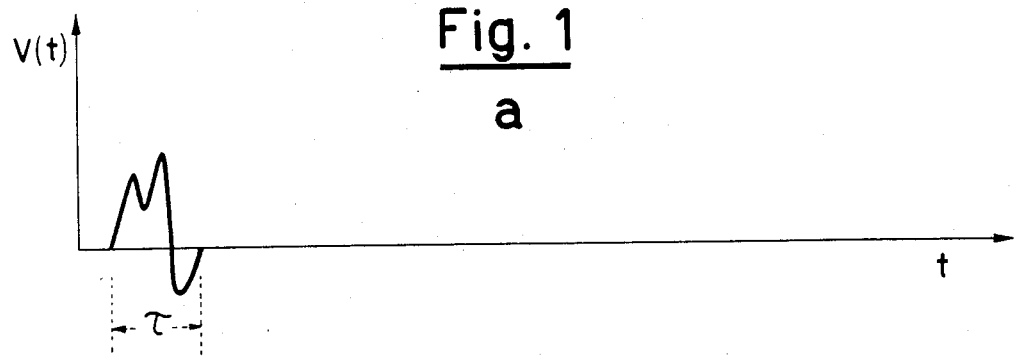
a
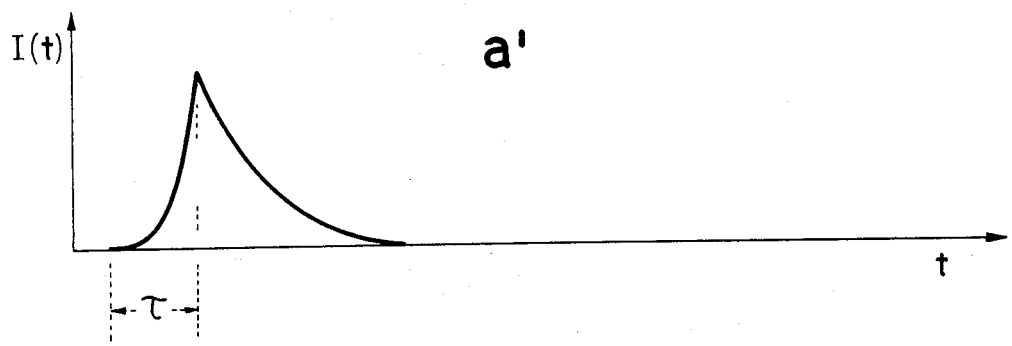
a'
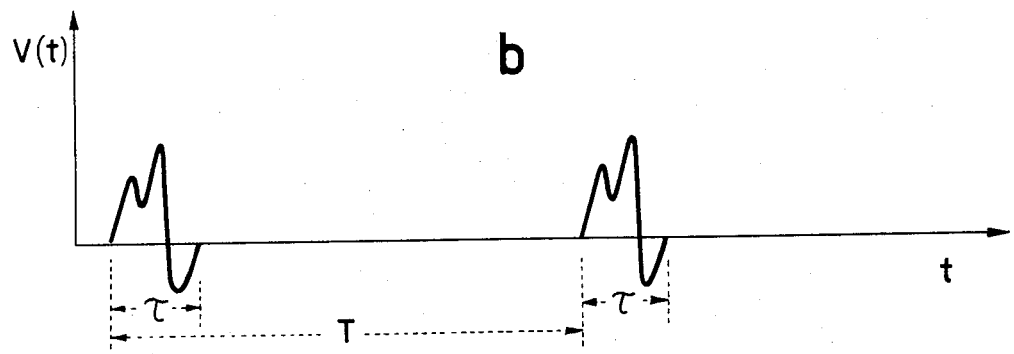
b
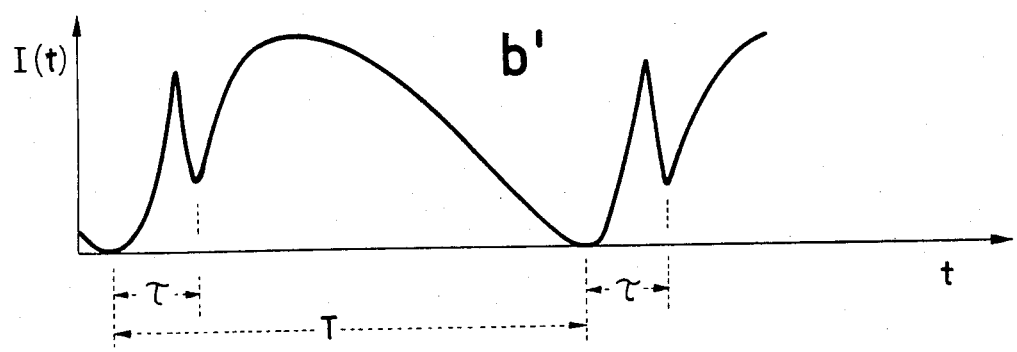
b'

Fig. 1
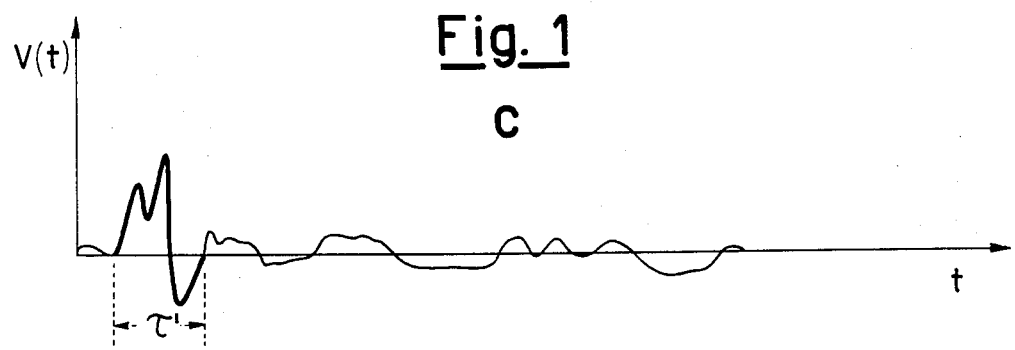
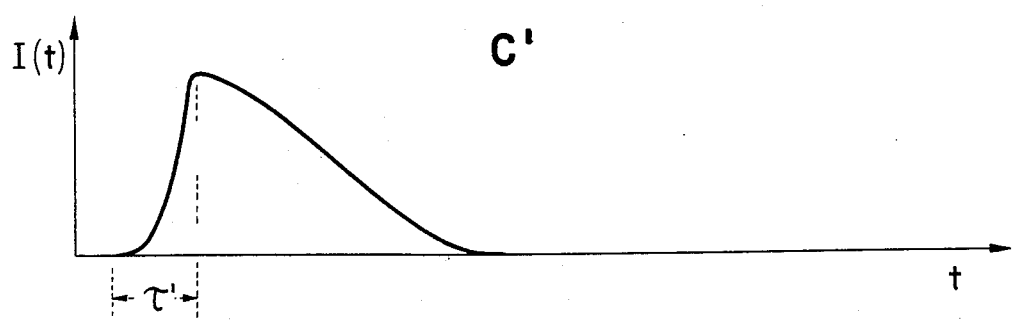
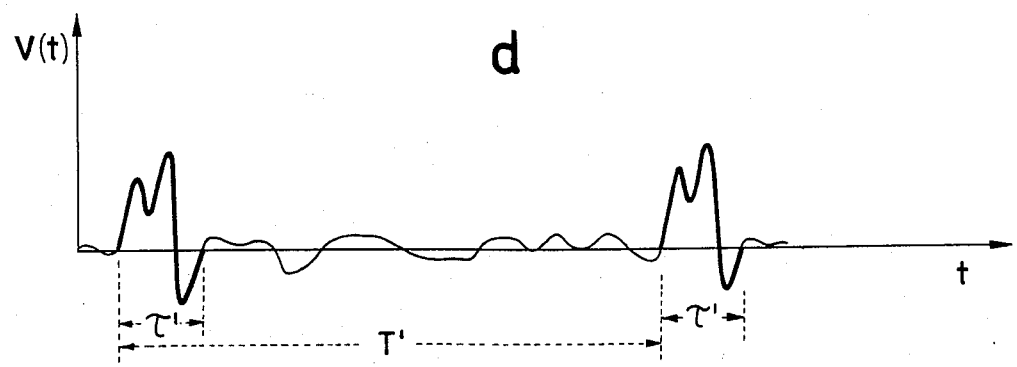
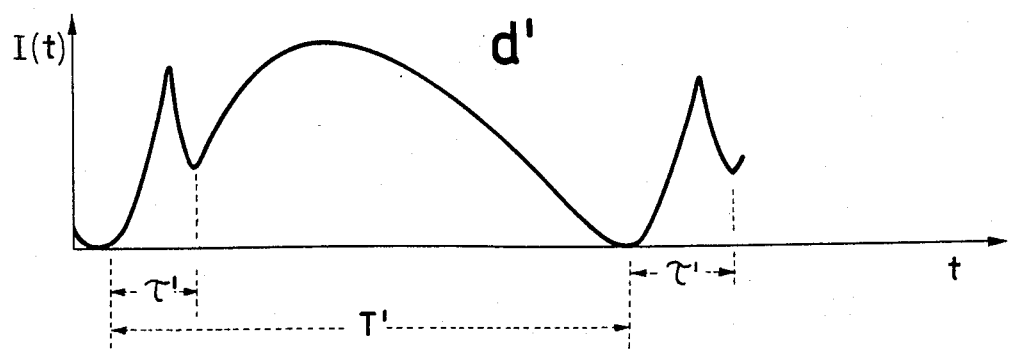

Fig. 4
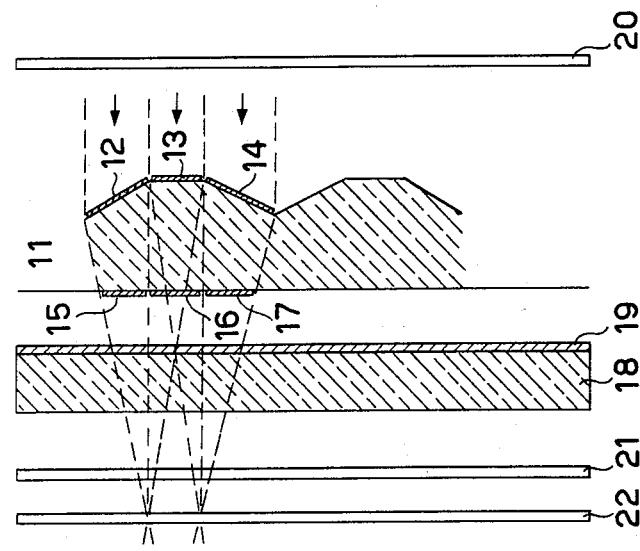
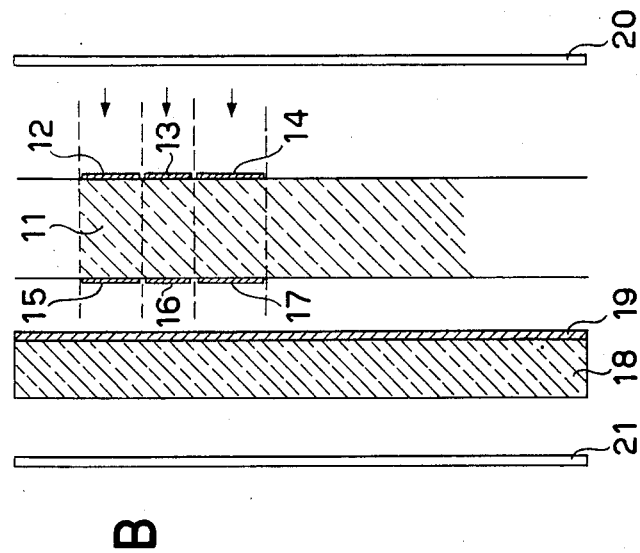

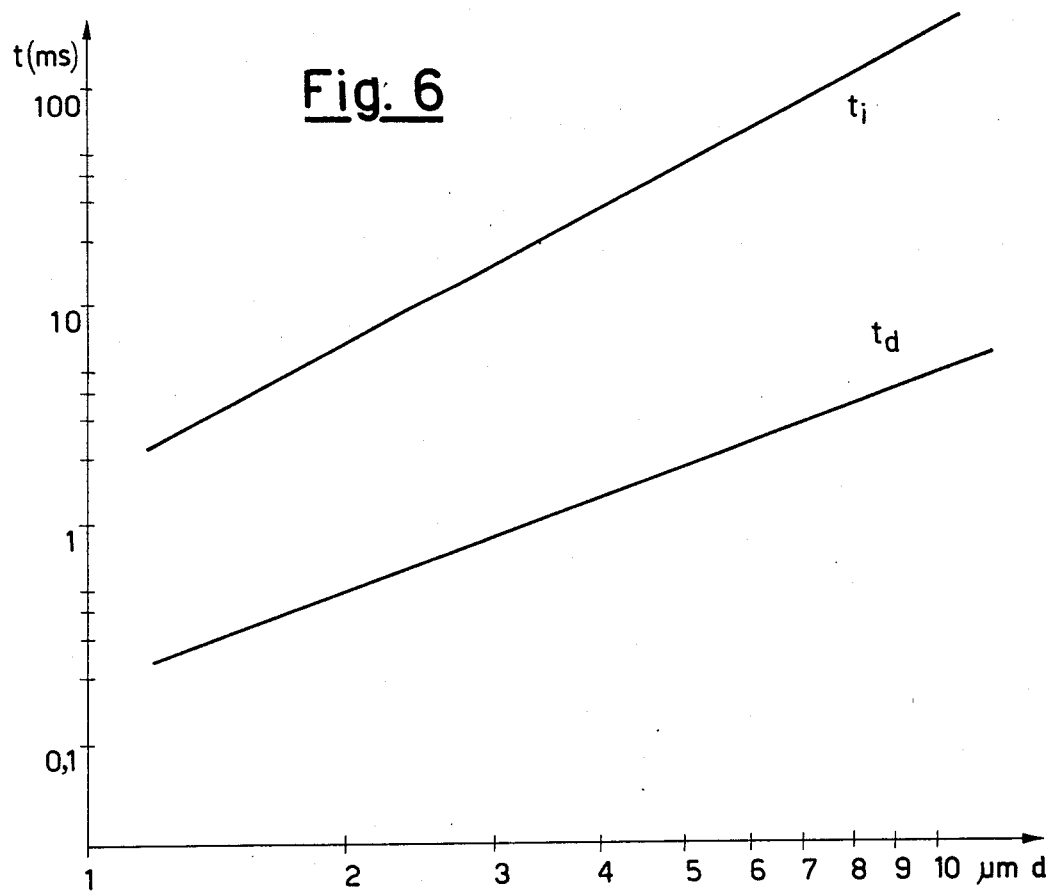
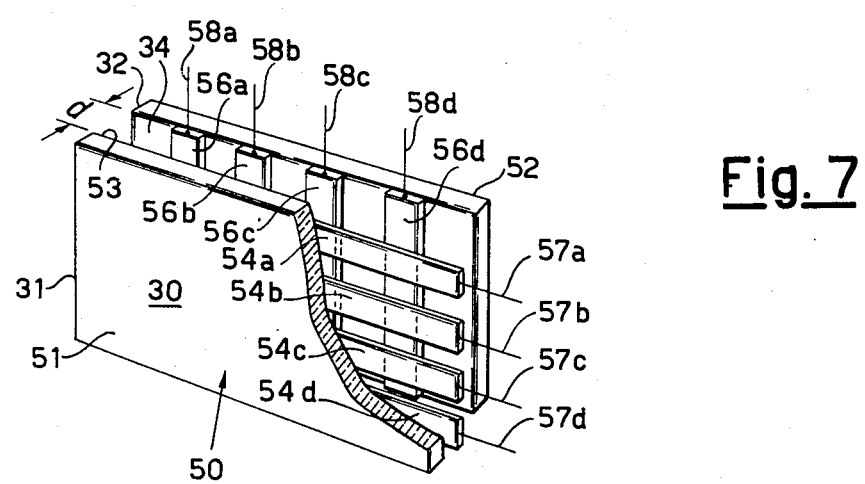

OPERATIONAL METHOD FOR DISPLAYING IMAGES WITH LIQUID-CRYSTAL ELECTRO-OPTICAL DEVICES, AND APPARATUS THEREFOR

This is a continuation of application Ser. No. 397,621, filed Sept. 17, 1973, now abandoned.

This invention relates to liquid-crystal electro-optical devices for image display, more particularly for displaying TV-images and alphanumerical data, and, still more particularly, to a novel method for effecting the controlled image display on a display medium based on liquid-crystal cells.

As is well known, the term "liquid crystals" is intended to connote mesomorphous phases of a few substances which, even being in the liquid state with the features which are inherent in such a condition, still retain a few properties of the solid crystalline state, more particularly anisotropy.

Among the several classes of liquid crystals which are of interest to the aims of the present invention, there are the so-called nematic substances, in which a regional molecular array is observed, which is characterized by a parallel alignment of the molecules.

An outstanding feature of the nematic substances which are normally transparent, is that, under the influence of an external electric field, scattering phenomena of the incident light may be experienced.

It has been attempted in the past (as evidenced by a copious literature) to resort to such properties and features of these substances by providing units or cells which substantially comprised two supporting members with a film of liquid crystal inserted therebetween, while simultaneously providing suitable means for applying to the liquid crystal an electric field to be controlled so as to originate temporary and desired optical contrast effects.

More particularly, in a few cases (DSM System, that is "Dynamic Scattering Mode"), the application of the electric field originated an ion circulation (that is, an electric current), which in turn, gave rise to a nondestructive turbulence and thus to the scattering phenomenon, which was localized to the area where the voltage and thus the electric field was applied.

This system is impaired by intrinsic limitations as to its applicability on account of the magnitude of the energization times (in the order of milliseconds) and the de-energization times (in the order of tens of milliseconds). Its use, for example in the TV-field and, in general, in high-multiplexing systems, is possible only under the condition of associating a circuit unit to each element.

In other cases, the application of the electric field gives rise to a straightening of the molecules of the nematic liquid crystal with positive dielectric anisotropy having originally a certain degree of spatial twist, as determined by means of a special machining of the liquid crystal supporting members.

A result of such a straightening is that the impinging polarized light beam is no longer rotated, with a luminous output from the analyzer which is opposite to that existing in the absence of the electric field.

Still in other cases (DAP System-) the application of an electric field to the liquid crystal having a homeotropic alignment and a negative dielectric anisotropy, in which all the molecules appear substantially aligned with the optical axis of the cell, causes a deformation of the alignment of the molecules, the result being a variation of the luminosity as transmitted by the cell positioned between two polarizers, provided that a certain threshold value of the RMS value of the voltage be exceeded. Luminosity tends towards a constant value in correspondence with which there is obtained the alignment of all the molecules in the deformed condition with saturation of the deformation.

However, in all these systems the energization and de-energization times are considerably high and the vision angle is reduced.

With all of these effects and systems, it has been attempted to obtain, in a commercially acceptable manner, electro-optical devices, such as panels and screens for the display of images and data, with a matrix arrangement. Such an arrangement involves, in turn, so-called matrix driving, by which a system is intended where there emerge from the panel a set of line contacts and a set of column contacts.

The complete panel is composed by elements, which are not necessarily marshalled geometrically and physically along lines and columns, each of which is associated with a couple of contacts, one line contact and one column contact, respectively. The coincidence of two electric energizations on these contacts causes a luminous response in the element defined thereby.

In general, these electro-optical devices for display, based on the systems indicated above, have several drawbacks, in connection with the application of such devices both for data display and for TV-screens (both black-and-white and color), which can be summarized as follows:

(I) The energization and de-energization times of each component cell are different and far from the values as provided for example by the TV standards (duration of the frame scanning of about 40 milliseconds with energization times in the order of 60 microseconds), unless the display panel is equipped with an intricate electronic circuitry, more particularly electronic components associated to every matrix element.

(II) In the cases in which such a circuitry is not required, the visual display is restricted to a narrow band of colours and in addition there are fixed luminosities which lead to a single colour for each hue, or the display takes place in black and white but without intermediate tones (grey scale).

It should be observed, moreover, that the liquid crystal cells of the prior art were, all of them, embodied with thicknesses of the liquid crystal film which were very low, sometimes in the order of a few microns, without however that such a choice was dictated by a well defined criterion as connected with the working condition.

In addition, it is worth mentioning the fact that a serious shortcoming of the display devices of the prior art lies in that they allow small shifts and thus angles of minimum magnitude to the observer with respect to an optimal position for observation, the result being a serious limitation in use.

Prior to defining and examining in detail the present invention and in order to render a better understanding possible, it is advisable to make a few preliminary considerations.

Let us consider a thin layer of a liquid crystal enclosed between two supporting surfaces, in the absence of any electric or magnetic fields. The molecules which make it up could become arranged according to various textures: more particularly, the homeotropic arrangement is the one in which the principal axis of the molecules is arranged perpendicularly to the surfaces, which have been appropriately treated to this end. The treatment of the surfaces, moreover, could be such as to induce an orientation of the molecules which is deflected, along a preferential direction, from 90° with respect to the supporting surfaces, as disclosed by F. J. Kahn - Electric. Field Induced Liquid Orientation Deformation of Nematic Crystals: Tunable Birefringence; Applied Physics Letters, Vol. 20, Mar. 1, 1972, page 199, or a homeotropic orientation which tends, in the presence of energization, to become deferred along a preferential direction, as disclosed by G. Assouline, M. Hareng and B. Leiba, in "Développements récents des dispositifs á cristaux lequides utilisant l'effet de birefringence électriquement contrôlée", Colloque International al sur les Dispositifs et Systémes d'Affichage Alphanumerique", Paris, 9-10 April, 1973.

In the following, the term substantially hemeotropic alignment will be intended to indicate one or a combination of the alignments as described above.

Let us consider now a liquid crystal cell between crossed polarizers, in which the liquid crystal is a nematic substance having a negative anisotropy and a substantially homeotropic alignment. Suppose to apply to the liquid crystal, in the cell as defined above, a voltage pulse having, for a preselected duration $\tau$ of the energization, a RMS amplitude as defined by the expression:

$$A_{eff} = \left[ \frac{1}{\tau} \int_0^\tau v_2(t)\, dt \right]^{\frac{1}{2}} \tag{I}$$

wherein v(t) is the value of the voltage as applied at the instant of time t.

When a voltage pulse of a short duration is applied, it is observed that, starting from a certain value of the RMS amplitude of the applied voltage, the intensity of the transmitted light is rapidly increased up to a peak value, and then decreases, possibly with appearance of other luminosity peaks.

A first object of the present invention is to provide an operational method for the actuation of an electro-optical image display device, of the kind comprising at least one cell with a liquid crystal having a negative dielectric anisotropy and a substantially homeotropic alignment.

Another object of the present invention is to provide an image display electro-optical device which is adapted for being used with the method outlined above, and which permits one to obtain:

(a) an operation both for projection and direct viewing and both with transmitted and reflected light;
(b) a wide visual angle;
(c) a very sharp contrast (in the order of a few hundreds);
(d) an exact reproduction of the greys;
(e) a faithful reproduction of the colors;
(f) an operation with energization times of a few microseconds and de-energization times in the order of fractions of a millisecond.

Another principal object of the present invention is to provide an operative method for the actuation of an electro-optical image display device of the matrix type as composed by a plurality of liquid crystal cells of the kind referred to above.

An additional object of the present invention is to provide a panel for the display of images, of the liquid crystal cell matrix type such as indicated above, more particularly for TV-images and/or data, alpha-numeric and the like, which (with particular reference to TV-images) and in addition to the possibilities enumerated above under (a) to (f) permits:

(g) the scanning of the entire panel in a short time, at least as short as that which is proper for TV-signals;
(h) the image between one scan and the next, with a satisfactory luminous efficiency;
(i) a rapid variation of the image in response to an abrupt variation of the applied signals;
(l) the possibility of partitioning the panel into a large number of elements, at least as large as that associated with the conventional television;
(m) a negligible influence of the signals intended to drive an element upon the remaining elements of the panel (a negligible cross-talk);
(n) a low cost and, more particularly, the absence of electronic components associated with each element of the panel;
(o) the possibility of building planar displays of even large sizes and of panels which can be used for projections, both in black-and-white and in color.

In order that these objects may be achieved, the present invention provides an operative mode for image display, with an electro-optical device comprising at least one liquid crystal cell, inserted between two polarizers, in which, between two supporting members, one at least of which is transparent and equipped with electrode conductive layers for applying electric pulses thereto, there is inserted a very thin film of a nematic liquid crystal having a negative dielectric anisotropy and a substantially homeotropic alignment, characterized in that to the liquid crystal, as a function of the physical specifications of the liquid crystal and the layer thickness, an impulsive energization is applied, each pulse being formed by any voltage waveform, such as not to induce a dielectric breakdown and having, in correspondence with white level, such a duration and such an RMS amplitude as to give rise, under the conditions of a single applied pulse, to a luminous response of the cell and not exceeding 1.3 times those which are necessary to produce a luminous response having a peak amplitude which cannot be further increased without the appearance of more than one peak, the pulse repetition period, in the case of a repetitive energization being such that, under steady state conditions, at the end of the period itself the luminous response of said cell corresponding to white level irreversibly falls to a value not exceeding one half of its peak value.

More exactly, and with reference to FIGS. from 1a-a' to 1d-d' in which there are shown some possible embodiments of the present invention and more particularly the voltage pulses v(t) as applied to the liquid crystal and the relative luminous response of the cell I(t):

In FIG. 1a-a' there is indicatively shown a possible single energizing pulse of a duration $\tau$(FIG. 1a) whereas FIG. 1a' shows the corresponding luminous response under the conditions indicated hereinafter as standard energization conditions, in which the peak amplitude of the luminous response is at a maximum corresponding to an RMS amplitude of the pulse which causes only one peak to appear in the luminous response.

In FIG. 1b–b', conversely, there is shown case of the repetition of the energization pulses, each having a duration τ, with a repetition period T which is the optimum one for which, under steady state conditions, the luminous response of the cell, corresponding to white level, falls to zero at the end of said period (FIG. 1b').

It will be observed that in this FIG. the single pulse of FIG. 1a is applied repetitively, with the optimum period. However, in the case of a repeated energization, both the RMS amplitude and the duration of the pulses corresponding to the white level may be smaller than, but not smaller than one half of, the values relative to the single energization.

In the case in which the liquid crystal is acted upon, between the energization pulses, by a voltage which is generally non-periodic and is insufficient, by itself, to energize the liquid crystal, for example as a result of the modulation of the other cells of a matrix device, the operative method as defined above remains unaltered, with the exception that the values of duration and amplitude of the pulses for energization and their possible period of repetition will be different and, in particular, there will be a decrease of the duration τ of the pulses and/or of their RMS amplitudes as well as an increase of the repetition period T. In FIG. 1c–c' there have been shown by way of example the conditions of standard energization, for the case of a single pulse and in the presence of a certain voltage subsequent to the pulse, which pulse will have, under the optimum conditions, a duration $\tau' < \tau$ and/or an RMS amplitude which will also be lower; in FIG. 1d–d' the same pulses as in FIG. 1c–c' are repeated with an optimum repetition $T' > T$.

Without delving in any detailed explanation of the basic principle of the present invention, an acceptable and plausible interpretation of the novel aspect of the method suggested herein would seem to lie in the fact that the applied energization voltages, though being very high, as in practice they correspond to maximum electric fields of from $10^4$ to $10^6$ V/cm, fields that under the conditions of the prior art could be conducive to the destruction of the liquid crystal, are applied in the form of pulses having a much shorter duration and a much longer period as compared with those which would be necessary to induce a steady condition of molecular deformation (to which there would correspond a selective, and thus colored, transmission of the light), or, under limiting conditions, the destruction of the liquid crystal, said pulses being however sufficient, even though applied individually, to cause a luminous response which is, as an average, non-selective (non-coloured) and near to the maximum which could be obtained, for a certain given cell, under steady conditions.

Stated otherwise, the method according to the invention provides that the liquid crystal cell works under "dynamic deformation" conditions, in which the liquid crystal has applied thereto energization pulses such as to deform the homeotropic alignment, thus originating a luminous response having a peak amplitude near the maximum one, at intervals between which the applied voltage is not sufficient to produce a deformation of the homeotropic alignment, so that the latter has time enough to be regenerated to an adequate degree and within so short a time as to permit the subsequent application of a further energization pulse, with negligible flicker. More particularly, the regeneration of the homeotropic alignment is such that the extremely quick variation in time of the color of the light as transmitted or reflected by each point of the electro-optical device is wide enough as to give rise (in the absence of filters) to the perception of light having the same color as the source.

This fact is diagrammatically depicted in FIG. 2, which shows, at the top, the luminous response of the cell, and, at the bottom, the deformation situations of the orientation of the molecules m of the liquid crystal, at the instants of time identified in Roman numerals, on the $I(t)$ curve.

An extremely important aspect of the method according to the present invention is that it becomes possible to obtain energization times and decay times, that is reset times of the luminous response of the cell which can be controlled and, above all, which are compatible with the standards, for example TV-standards.

As a matter of fact, the method according to the invention permits to identify, as has been experimentally tested and as will be explained in detail hereinafter in connection with an exemplary embodiment, a curve of equal luminous response which depends upon the nematic liquid crystal materials, the treatment of the surfaces between which the liquid crystal film is so contained and the thickness of the film, said curve establishing the relationship between the duration of the single energization pulse and its RMS amplitude for example in the above indicated conditions of standard energization.

It has now been found that, on the basis of the energizations which can be read on these curves, plots can be drawn which establish the relationships between the thickness of the liquid crystal layer, as a function of the nature thereof, and the return to zero of the luminous response amplitude, both in the case of a single energization pulse and in the case of a sequence of such pulses, for example repeated according to the optimum period (times which generally are different in the experimental trials), and in other possible driving conditions.

The importance of the possibilities indicated above can be better understood and appreciated when considering that it becomes not only possible but also convenient, once the experimental curves have been drawn, to obtain a desired duration for the return to zero of the luminous response of the cell and, furthermore, a considerably wide interval of the possible durations.

The consequences of the method as suggested by the present invention are important to the operation of matrix display devices comprising a plurality of liquid crystal cells such as defined hereinabove. As a matter of fact, due to the sensitivity of the luminous response of each cell to slight variations of the RMS amplitude of the pulses applied to the liquid crystal, it is possible to achieve the control of the entire matrix device, by scanning one or few lines at a time, with strong voltage pulses on the lines (such as those defined hereinabove), and the simultaneous application to every column of a continuous or non-continuous modulation voltage, which is much weaker and, if the pulses on the lines are lacking, is insufficient to produce energization, the voltage applied to each elementary cell being the difference between the voltages applied to the corresponding line and column.

Moreover, with the method according to the present invention it becomes readily possible to prevent crosstalk phenomena from occurring in each column in the case of a high number of lines, as a consequence of the low voltage which is applied to the columns. As a matter of fact, in addition to the possibility of resorting to constructional modifications of the cells which make up the matrix device, it is possible to minimize the voltages as applied to the columns as a whole, for example by summing, in correspondence with the selection pulse of each line, to all the columns and to the selected line, a certain waveform selected so as to nullify, at every instant of time, the arithmetic mean value of the voltages present on the column or to sum to the voltages of the columns waveforms which are not correlated with the line voltages, so as to increase the average RMS value in the frame period of the column voltages, in order to make it a constant for all the columns and for each scan, the line voltages being accordingly diminished.

In the case of TV-applications, the modulation voltages as applied to the column should be obtained by a series-parallel conversion of the information contained in the TV-signal, such a conversion being for example effected by means of integrated circuits located on the edges of the electro-optical matrix device or panels.

As already outlined above, another aspect of the present invention lies in an improvement as introduced in the image-display electro-optical devices, particularly those adapted for the application of the method as illustrated in the foregoing. Such an improvement can thus be briefly summarized:

(a) From the point of view of the electric driving of a cell or a plurality of liquid crystal cells, the best performance, as to luminous efficiency and rapidity of modulation of the luminous response of the cell or of each cell, are obtained when the liquid-crystal layer inserted between the two supporting members, one at least of which is transparent, has a thickness near the optimum specific thickness for the particular liquid crystal used in the preselected driving conditions. The term optimum thickness of the liquid crystal is used to mean that thickness for which the return to zero of the luminous response of the cell, under the preselected driving conditions, takes place in a time equal to the interval between two pulses. Inasmuch as, as outlined above, the return to zero plots, as a function of the driving conditions and the layer thickness of the liquid crystal can be either drawn experimentally or theoretically forecast for each nematic substance as contemplated in the present invention, it is apparent that it is possible to define the optimum thickness of the liquid crystal layer in correspondence with a certain average RMS voltage applied between the energizing pulses and of a desired return to zero time of the luminous response, the latter being obviously a function of the use one makes of the cell and the electro-optical image-display device. As already explained, once the thickness and the pulse duration have been selected, the experimental plots or corresponding mathematical relationships permit readily to determine the RMS amplitude of the energization pulses to be applied to the liquid crystal;

(b) In the case of TV-image display screens with the liquid crystals as known nowadays and for an operation at room temperature, it has been found, moreover, that the thickness of the liquid crystal layer should not exceed, as a rule, a value of 5 microns;

(c) In addition to the thickness prerequisite, it has been found that the electro-optical device according to the present invention should exhibit the maximum possible uniformity of thickness throughout the liquid crystal layer sandwiched between the two supporting members, the variations in the uniformity not exceeding a value of 30% and, in the case of screens for displaying TV-images, such a variation cannot exceed 15% (the variations being obviously intended in both directions);

(d) It has also been found that, in combination with the liquid crystal, a doping agent can also be used, which consists, for example, of traces of water, in order to reduce the elastic return forces (Frank's elastic constants) or to extend, all the other conditions being the same, the return-to-zero time of the luminous response. The use of the doping agent is preferred, in the actual practice, when it is desired to obtain the same return-to-zero time with smaller optimum thicknesses of the liquid crystal, which permit the use of weaker driving pulses and the operation of the cell under a wider solid angle.

Yet another aspect of the present invention is to make possible the display of color images from synthesis of principal colors (rather than by interference effects inherent in the liquid crystal under the conditions of use).

The present invention will now be described in connection with embodiments thereof having a merely exemplary significance without limitations, with reference to the accompanying drawings, wherein:

FIGS. 1a–a'–1d–d' and 2 have the meanings which have been explained hereinabove.

FIGS. 4a and 4b show possible embodiments of an elementary cell for colored displays with the additive system.

FIGS. 5 and 6 show examples of plots relating to the modes of operation of the cells and the devices according to the present invention.

FIG. 7 shows a diagrammatical example of a panel for the display of TV-images according to the method of the present invention.

Figure 2:
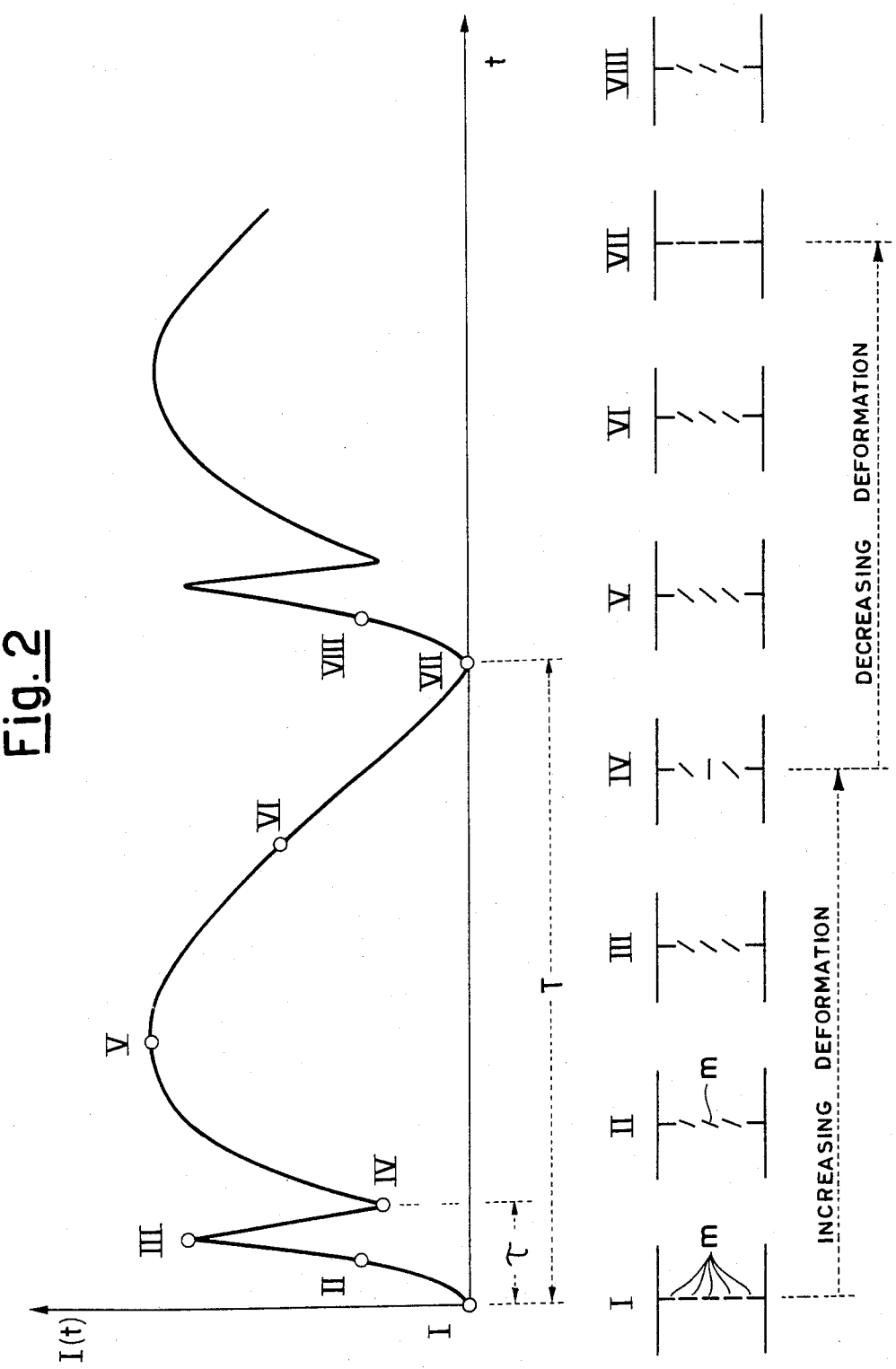
Figure 3:
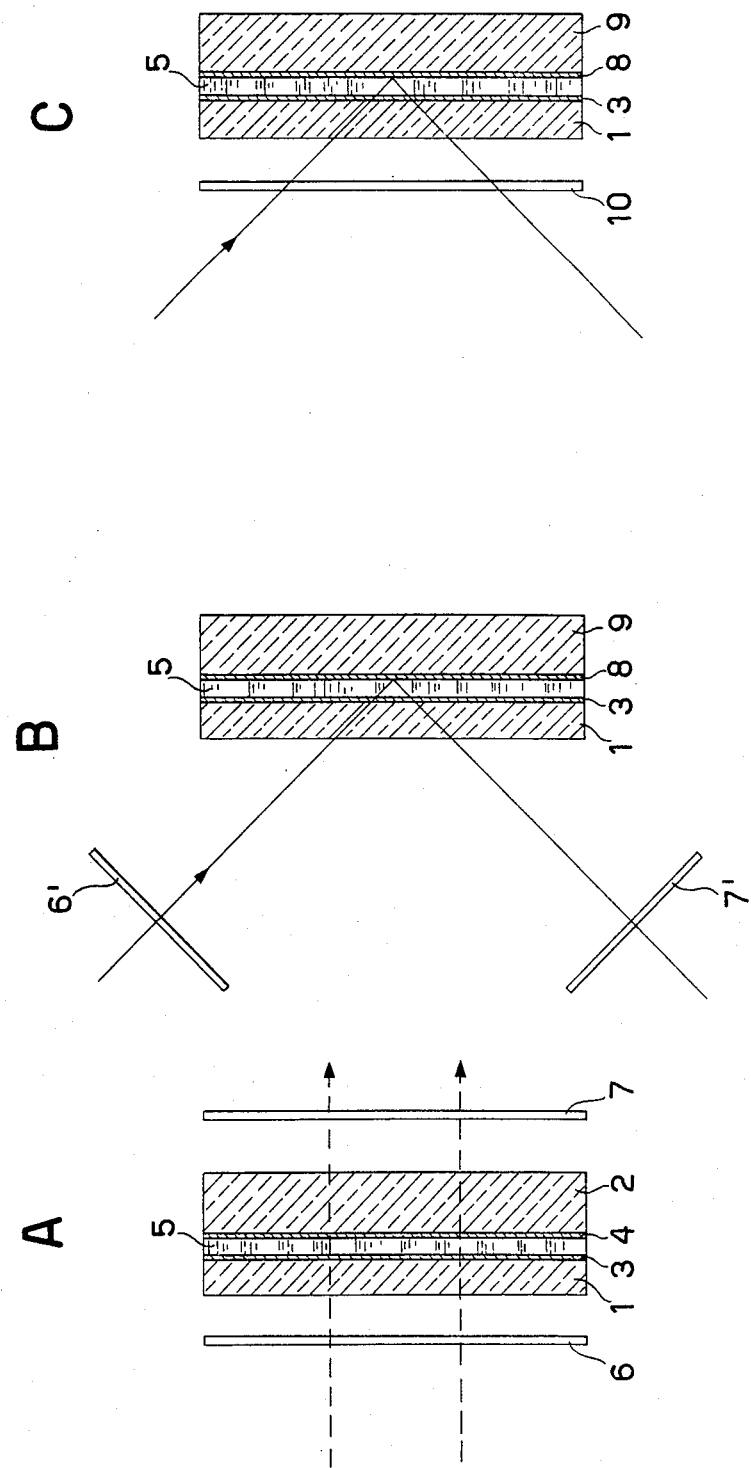
FIGS. 3a, 3b and 3c show diagrammatical exemplary arrangements of elementary cells with liquid crystals.

With reference to FIGS. 3a . . . 3c, an elementary cell operating in the transmission mode as shown in FIG. 3a comprises first and second transparent layers 1, 2 of an optically isotropic dielectric material, such as glass, one at least of which acts as a mechanical supporting member. To each of the layers 1, 2 an electrically conductive transparent layer 3, 4 is adhered, formed for example by pyrolytic stannioxide ($SnO_2$). In the interspace between the two layers 3, 4 is sandwiched a layer of an electro-optically active material 5, that is, a nematic liquid crystal having a negative dielectric anisotropy, and having a constant thickness. The cell is completed by a polarizer and an analyzer, 6 and 7, respectively.

In the elementary cells depicted in FIGS. 3b and 3c, which operate by reflection, the back conductive layer 8 is metallically specular (or a dielectric mirror is used) and the containment layer 9 can also be non-transparent.

In the case of the elementary cell of FIG. 3b, a polarizer 6' and an analyzer 7' are used. In the cell of FIG. 3b a polarizer/analyzer (for example a circular one) is used, as indicated at 10.

Polarizers and analyzers are of such a kind and orientation that with the inactive cell (no electric signal present) the light which is either transmitted or reflected is nil, or is at a minimum possible level.

Between the layer as formed by the liquid crystal and its control electrodes, layers can also be present which are electrically, chemically and/or optically active, not shown, in order to modify the operational features of a cell. Furthermore, it is necessary to insert between the electrodes means for assuring a constant thickness.

As a principle, the use is shown of collimated light, but this is not rigorously necessary since the collimated-light is required only in the case when the cell is used for projection.

As regards the structure of the cell, the surfaces which are in contact with the liquid crystal are treated in such a way that, under at rest conditions (no voltages applied to the control electrodes), the liquid crystal arranges itself under a substantially homeotropic alignment.

The above suggested treatment can comprise a cleaning operation such as with a mixture of sulphuric and chromic acids followed by washing in distilled water. The adoption of surfactants, such as lecithin, may be useful.

The liquid crystal can be supplemented by doping agents such as for example lecithin itself or the polyamide derivative known in the trade under the name "VERSAMID".

Procedures can also be adopted which are capable of originating on the surfaces which contact the liquid crystal preferential deformation directions of the orientation of the principal axis of the liquid crystal and/or directions along which said orientation (under rest conditions) is at an angle with respect to the normal. All this has the purpose of rendering both quicker and more uniform response of the cell to the driving pulses.

This can be obtained for example by rubbing each surface, along a certain direction, with chamois leather and a very thin abrasive. For example a preferential direction to 45° with respect to linear polarization of the incoming light, or two preferential directions can be formed, one on each electrode, parallel to the directions of the linear polarizer and the analyzer as used in crossed positions.

FIGS. 4a and 4b show a possible application of the arrangement according to the invention to embody a display screen for colored images with the additive synthesis.

In this case, there is provided a transparent supporting member 11, which is electrically isotropic and carries on a side ridges 12, 13, 14 on each of which there have been applied optically filering layers for the primary colors as used in the additive synthesis, On the opposite surface of the supporting member 11 there have been applied the strips of electrically conductive and transparent material, as indicated at 15, 16, 17, each relating to one of the primary colors indicated above. There is also the containment layer 18, which carries the line conductive layers 19 which have no different characteristics as compared with those of the previously described black and white screens. The structure as described is sandwiched between the polarizers 20, 21 and a diffuser is further provided, at 22, on which the beams relative to the primary colors are caused to converge.

The widths of the strips 12, 13, 14 are so selected as to meter the three quantities of primary light on taking into account the possible colored dominants as introduced by the polarizer layers.

In FIG. 4b there is shown a similar structure, with the side of the supporting member 11 carrying the optically filtering strips all arranged on a plane. The same numerals indicate the same component parts. In the structure of FIG. 4b the diffuser screen 22 is dispensed with and the spatial "integration" is brought about by the observer's eye.

Figure 5:
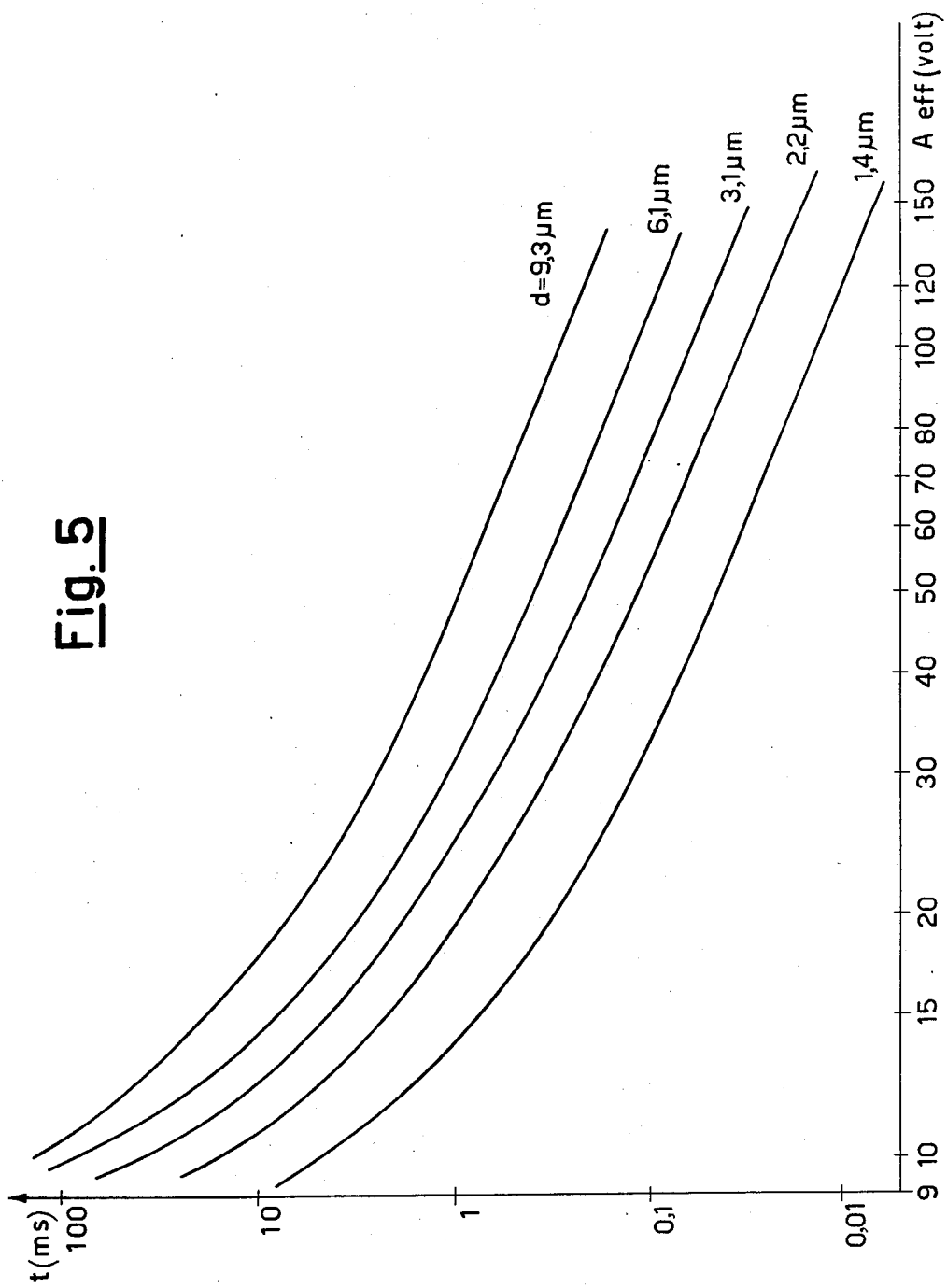

FIGS. 5 and 6 report the curves as found experimentally for a liquid crystal of H-(p-methexybenzylidene)-p-butylaniline, hereinafter abbreviated as MBBA, at 25° C., between two glossy conductive surfaces treated with lecithin, without any alignment preferential directions and for a zero applied voltage out of the durations of the pulses. Each curve of FIG. 5 gives, for a different cell thickness, the values of duration and RMS amplitude of the energization pulses with which, upon application of the standard energization pulse, substantially equal luminous responses are obtained. For each thickness the response has been selected which exhibits a single luminous amplitude peak which cannot be increased as the amplitude or the duration of the single applied pulse is increased.

By applying the pulses so defined and repeating them immediately after the return to zero of the luminous response, the time required by the response to return to zero has been measured, as a function of the thickness and it has been found, in addition, that this time is a function of the thickness only. It is given by the plot $t_i$ of FIG. 6.

The curve $t_d$ gives the time for return to zero in the case of a single pulse, rather than a pulse sequence.

Assuming that one desires to provide a TV panel operating according to the standard adopted in Italy (C.C.I.R.) in the hypothesis of validity of the plots, from the curve $t_i$ of FIG. 6, one finds, in correspondence with 40 milliseconds (frame period) the optimum thickness $d_c = 4.6$ microns. From the curves of FIG. 5 it is possible to find, in correspondence with the line period of 64 microseconds and the thickness $d_c = 4.6$ microns, the maximum pulse amplitude (level of the white) which is 115 V. In this case, the necessity of applying a modulation voltage on the columns has been overlooked. As an indication, the level of the black is generally lower by about 25%.

For a certain thickness, with repeated energization pulses which are either stronger or weaker than those of FIG. 5, return-to-zero times, $t_i$, are found, which are either longer or shorter than those of FIG. 6, respectively. Said variations are contained within a factor of about 2. These different situations could be resumed by curves similar to those of FIGS. 5 and 6. For weaker pulses, the number of the necessary scans is increased in order that the image may be stabilized and the modulation percentage required for passing from white to black is decreased; the contrary occurs for stronger pulses.

It is important to emphasize the fact that FIGS. 5 and 6 refer to nematic liquid crystals of MBBA. For more detailed information on these liquid crystals, their properties and their identification, reference is made to the literature books, such as for example Brown, "The Mesomorphic State, Liquid Crystals", Vol. 57, No. 6, of Chemical Reviews, December 1957, or to Gray, "Molecular Structure and Properties of Liquid Crystals", Academic Press, London, 1962. In addition to pure liquid crystals, complex mixtures of two or more nematic substances may also be used consistently with the working requirements as dictated by the use for which the electro-optical device is intended. For a more expeditious application of the present invention, once the other parameters have been selected, it will be easy for a manufacturer to prepare plots similar to those of FIGS. 5 and 6, which are easy to read, or to provide the necessary indications (mathematical formula or the experimental law for obtaining same).

These plots will be, as outlined above, different according to RMS voltage which is applied during interpulse times, the same being true for the case of doped liquid crystals.

In FIG. 7, there is shown an optical display device of the matrix type, 50, comprising two transparent planar supporting members 51 and 52. The two supporting members 51, 52 are parallel and spaced apart by a selected distance for the optimum value according to the criterion as defined hereinbefore.

On the inner face 53 of the supporting member or slab 51 there has been formed, for example by deposition of SnO$_2$, an orderly array of conductive lines. In the drawing there have been shown four conductive strips 54a, 54b, 54c and 54d, it being understood that such an indication is an example only. On the inner face 55 of the supporting member 52 there is deposited a similar array of ordered conductive strips 56a, 56b, 56c and 56d, which are located perpendicularly to the conductive strips 54, thus making up a matrix arrangement in lines and columns. The space comprised between the supporting members 51 and 52 is filled with a nematic liquid crystal of the kind identified above, care being taken to assure that the thickness of the liquid crystal is within the evenness range as identified above. The device 50 is obviously positioned, in turn, between two polarizers (not shown) and electric conductors 57 (a;b;c;d) and 58 (a,b,c,d) are associated with the conductive strips 54 (a,b,c,d) and 56 (a,b,c,d) for applying the working pulses.

The device 50 has also associated therewith conventional devices of the appertaining art for scanning the several lines and columns of the matrix array.

As it is obvious, for the operation of the device 50, the corresponding curves of FIGS. 5 and 6 will be used, consistent with the type of liquid crystal and the physical properties of the device concerned.

Lastly, it will be understood that modifications and changes which are ideally equivalent may be introduced without departing from the scope of this invention.

What is claimed is:

1. An electro-optical device for the display of images of the kind comprising at least one liquid-crystal cell formed by two supporting members, one at least of which is transparent and which are provided with electrode conductive layers and whose surface is so treated as to determine a desired substantially homeotropic orientation, between which there is inserted a small thickness film of a nematic liquid crystal having a negative dielectric anisotropy and a substantially homeotropic alignment, said supporting members being inserted between two polarizers, said liquid crystal film having a predetermined thickness not exceeding 10 microns, and a thickness uniformity ranging within ±30% of the predetermined thickness, said device having further means for applying to the electrodes energization pulses having a duration and an RMS amplitude coordinated with each other and with said predetermined thickness of liquid crystal for causing said device to provide luminous response, said duration and said RMS amplitude each not exceeding those maximum values thereof which produce a single peak of luminous response which cannot be increased by exceeding said maximum values.

2. An electro-optical device according to claim 1, more particularly for the display of television images, characterized in that said thickness of the liquid crystal is not more than 5 microns and said evenness is comprised within ±15% of the preselected value.

3. An electro-optical device according to claim 1, characterized in that said liquid crystal is selected from the group consisting of N-(p-methoxy-benzylidene)-p-butyl aniline or mixtures thereof with other nematic liquid crystals of the same class.

4. An electro-optical device according to claim 1, characterized in that the at least one liquid crystal cell is inserted between two linear polarizers, the latter being optically crossed.

5. An electro-optical device according to claim 1, characterized in that the at least one liquid crystal cell is inserted between a circular polarizer and a reflecting surface.

6. An electro-optical device according to claim 1, characterized in that the liquid crystal is supplemented with doping substances, more particularly water.

7. An electro-optical device according to claim 1, characterized in that between the liquid crystal and at least one electrode there is inserted a dielectric layer.

8. An electro-optical device for the display of images, claim 1, arranged for the display of colored images by additive synthesis, characterized in that a plurality of cells are arranged in matrix form, the column elements being subdivided into three parts corresponding to each primary color.

9. The method of displaying images which comprises the steps of:
 (a) providing an electro-optical device which comprises at least one liquid crystal cell disposed between two polarizers; said cell comprising two supporting members and an intervening film of nematic liquid crystal having a negative dielectric anisotropy and a substantially homeotropic alignment, said film being of predetermined thickness;
 (b) illuminating said device whereby it may provide luminous response; and
 (c) energizing said device with a pulse having a duration and an RMS amplitude coordinated with each other and with said predetermined thickness of liquid crystal for causing said device to provide luminous response, said duration and said RMS amplitude each not exceeding those maximum values thereof which produce a single peak of luminous response which cannot be increased by exceeding said maximum values.

10. The method according to claim 9 wherein said device is energized repetitively at a pulse repetition period not less than that at which a successive pulse occurs at that instant when the luminous response has decayed to a value not more than half the value of said single peak.

11. The method according to claim 10 wherein the duration and RMS amplitudes of said pulses have values at least half said maximum values thereof.

12. The method according to claim 9 wherein the duration of said pulse is less than 1 millisecond.

13. The method according to claim 10 wherein the duration of said pulses are less than 1 millisecond.

* * * * *